US006414098B1

United States Patent
Engehausen et al.

(10) Patent No.: US 6,414,098 B1
(45) Date of Patent: Jul. 2, 2002

(54) CATALYST SYSTEM FOR OLEFIN POLYMERIZATION

(75) Inventors: Rüdiger Engehausen, Dormagen; Wolfgang Nentwig, Bergisch Gladbach; Peter Schertl, Leverkusen; Michael Arndt-Rosenau, Hamburg; Oliver Pyrlik, Hamburg; Maud Guillemot, Hamburg, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/543,968

(22) Filed: Apr. 7, 2000

(30) Foreign Application Priority Data

Apr. 14, 1999 (DE) .......................................... 199 16 782
Jul. 9, 1999 (DE) .......................................... 199 31 873

(51) Int. Cl.$^7$ ................................................. C08F 4/42
(52) U.S. Cl. ...................... 526/161; 526/171; 526/172; 526/131; 526/134; 526/348; 526/160; 502/162; 502/104
(58) Field of Search ................ 5269/161, 171, 5269/172, 151, 154, 348, 160; 502/162, 104

(56) References Cited

U.S. PATENT DOCUMENTS

| 5,668,230 A | 9/1997 | Schertl et al. | 526/160 |
| 5,886,117 A | 3/1999 | Campbell, Jr. | 526/134 |
| 5,955,555 A | 9/1999 | Bennett | 526/133 |

FOREIGN PATENT DOCUMENTS

| EP | 924223 | 6/1999 |
| EP | 1 044 992 | * 10/2000 |
| WO | WO 98/27124 | * 6/1998 |
| WO | WO 98/30612 | * 7/1998 |
| WO | WO 99/02472 | 1/1999 |
| WO | WO 99/12981 | 3/1999 |
| WO | WO 00/15646 | 3/2000 |
| WO | WO 00/24788 | 5/2000 |

OTHER PUBLICATIONS

G.J.P. Britovesk et al., J. Am. Chem. Soc., 121, 8731 and 8737 (1999).*
B.L.Small, J. Am. Chem. Soc., 120, 4049 (!998).*
Chem. Commun. (Month Unavailable) 1998, pp. 849–850, Britovsek et al, "Novel Olefin Polymerization Catalysts Based on Iron and Cobalt".
J. Amer. Chem. Soc. (Month Unavailable) 1998, 120, pp. 4049–4050, Small et al, "Highly Active Iron and Cobalt Catalysts for the Polymerization of Ethylene".
J. Amer. Chem. Soc. (Month Unavailable) 1998, 120, pp. 7143–7144, Small et al, "Iron–Based Catalysts with Exceptionally High Activities and Selectivities for Oligomerization of Ethylene to Linear α–Olefins".
Macromol. Rapid Commun., 19, (Month Unavailable) 1998, pp. 651–655, Pellecchia et al, "Isotactic–Specific Polymerization of Propene with an Iron–Based Catalyst: Polymer End Groups and Regiochemistry of Propagation".
Macromolecules (Month Unavailable) 1999, 32, pp. 2120–2130. Small et al, "Polymerization of Propylene by a New Generation of Iron Catalysts: Mechanisms of Chain Initation, Propagation, and Termination".
Chem. Rev. (Month Unavailable) 1988, 88, pp. 1405–1421, Beck et al, "Metal Complexes of Weakly Coordinating Anions. Precursors of Strong Cationic Organometallic Lewis Acids".
Chem. Rev. (Month Unavailable) 1993, 93, pp. 927–942, Strauss, "The Search for Larger and More Weakly Coordinating Anions".
Angew. Chem. Int. Ed. Engl, 33 (Month Unavailable) 1994, pp. 375–384, Hoss et al, "Template Syntheses".
J. Anorg. Chem. Soc, 60, Feb., 1938, pp. 309–319, Brunauer, et al, "Adsorption of Gases in Multimolecular Layers".
J. of Colloid and Interface Sci., vol. 78, No. 1, Nov., 1980, pp. 31–36, McDaniel et al, "Total Porosity of High–Pore–Volume Silicas by Liquid Adsorption".
Applied Optics, vol. 11, No. 2 Feb., 1972, p. 265, Cornillault, "Particle Size Analyzer".
Ullmann's Enzyklopadie der tech. Chemie, vol. 21 (Date Unavailable) pp. 439–479, Weiss et al "Siliciumdioxid".
Ullmann's Enzyklopadie der tech. Chemie, vol. 23, (Date Unavailable), pp. 311–326, Lagaly et al, "Ton und Tonminerale".
Ullmann's Enzyklopadie der tech. Chemie, vol. 14, (Dat Unavailable) pp. 633–651, "Einleitung".
Ullman's Enzyklopadie der tech. Chemie, vol. 24, (Date Unavailable) pp. 575–578, Mengel, "Zeolithe".
Ullmann's Enzyklopadie der tech. Chemie, vol. 19, (Date Unavailable), pp. 195–211, "Polypropylen".

* cited by examiner

Primary Examiner—David W. Wu
Assistant Examiner—Ling-Siu Choi
(74) Attorney, Agent, or Firm—Joseph C. Gil; Noland J. Cheung (57) ABSTRACT

This invention relates to a catalyst system containing bisiminopyridyl complexes of cobalt and/or iron with bulky substituents on the bisiminopyridyl ligand, to a method for the polymerization of α-olefins, particularly ethylene, and to the use of the polyolefins which can be produced by said method for the production of moldings of all types.

4 Claims, 1 Drawing Sheet

Fig. 1

CATALYST SYSTEM FOR OLEFIN POLYMERIZATION

FIELD OF THE INVENTION

This invention relates to a new catalyst system containing bisiminopyridyl complexes of cobalt and/or iron with bulky substituents on the bisiminopyridyl ligand, to a method for the production thereof, to a method for the polymerization of α-olefins, particularly ethylene, and to the use of the polyolefins which can be produced by such method for the production of moldings of all types.

BACKGROUND OF THE INVENTION

WO-A-98/27124 describes a method for the polymerization of ethylene by means of bisiminopyridylcobalt or -iron complexes of general formula (I) and co-catalysts, and describes the support of catalyst systems of this type in a liquid phase or in a fluidized bed process. WO-A-98/30612 describes a method for the polymerization of propylene by means of the catalysts disclosed in WO-A-98/27124.

WO-A-99/02472 describes bisiminopyridyl complexes of iron and the use thereof for the oligomerization and polymerization of ethylene. WO-A-99/12981 describes a catalyst system comprising bisiminopyridyl complexes of iron, cobalt, ruthenium or manganese for the homo- and copolymerization of ethylene and α-olefins.

(I)

G. J. P. Pritovsek et al., Chem. Commun. 1998, pages 849–50 (1998) describe bisiminopyridyl complexes of iron and cobalt of general formula (I), and describe the synthesis and use thereof as polymerization catalysts.

B. L. Small, M. Brookhart, A. M. A. Bennett, J. Am. Chem. Soc. 120, pages 4049–50 (1998), and B. L. Small, M. Brookhart, J. Am. Chem. Soc. 120, pages 7143–4 (1998) also describe bisiminopyridyl complexes of iron and cobalt of general formula (I), as well as the synthesis and use thereof as polymerization catalysts.

C. Pellecchia, M. Mazzeo, D. Pappalardo, Macromol. Rapid. Commun. 19, 651–55 (1998), and B. L. Small, M. Brookhart, Macromolecules 1999, 32, 2120–30 (1999) also describe bisiminopyridyl complexes of iron and cobalt of general formula (I) and the use thereof as polymerization catalysts for propylene.

A common feature of all these documents is that in the bisiminopyridyl complexes which are disclosed, the $R^3$ and $R^4$ radicals, independently of each other, represent hydrogen or hydrocarbon radicals which are optionally substituted, or represent functional groups. $R^3$ and $R^4$ are most preferably, hydrogen and/or methyl radicals. One significant disadvantage of the synthesis which is described according to the prior art is that it is not possible to produce bisiminopyridyl ligands and complexes which comprise bulky $R^3$ and $R^4$ radicals. Reaction times, which are unsatisfactorily long, as well as low overall yields, are described for these complexes which can be obtained according to the prior art.

SUMMARY OF THE INVENTION

Consequently, one object of the present invention is to provide bisiminopyridyl complexes of iron and cobalt which exhibit improved catalytic properties. A further object of the invention is to provide an improved method of producing said bisiminopyridyl complexes of iron and cobalt. A further object of the present invention is to provide an alternative method for the production of the bisiminopyridyl complexes of iron and cobalt. A further object of the present invention is to provide a method for the production of polyolefins with the aid of the bisiminopyridyl complexes of iron and cobalt. A further object of the present invention is to provide high molecular weight polyolefins using the bisiminopyridyl complexes of iron and cobalt.

Surprisingly, it has now been found that catalyst systems which exhibit higher activity, and polyolefins which have a significantly narrower molecular weight distribution, can be obtained if $R^3$ and $R^4$ constitute bulky substituents. Moreover, a method has been provided which enables bisiminopyridyl complexes of iron, cobalt, nickel or palladium, which correspond to general formula (I) and which comprise bulky $R^3$ and $R^4$ radicals, to be produced in high yield.

The present invention therefore relates to a catalyst system containing a compound of general formula (I)

wherein

M is selected from iron, cobalt, nickel or palladium,

Q is a mono-anionic or non-anionic ligand, $R^1$ and $R^2$, independently of each other, represent an aryl radical which is optionally substituted, $R^3$ and $R^4$, independently of each other, represent a bulky substituent, $R^5$, $R^6$ and $R^7$, independently of each other, are selected from hydrogen, a $C_1$–$C_{10}$ alkyl group which is optionally substituted, or a $C_6$–$C_{14}$ aryl radical which is optionally substituted, or are parts of a ring system, and n represents an integer within the range from 1 to 3, and containing one or more compounds which form a transition metal complex cation.

DETAILED DESCRIPTION OF THE INVENTION

The ligands which can be used as the mono-anionic or non-anionic ligand Q comprise all the ligands which are known to one skilled in the art and which can be abstracted with the compound which forms a metal complex cation with the formation of non-coordinating or weakly coordinating anions.

With regard to non-coordinating or weakly coordinating anions, reference is made to W. Beck et al., Chem. Rev. 88, 1405–1421 (1988) and to S. Strauss 93, 927–42 (1993).

In general, Q is selected from a halide, a hydride, a $C_1$ to $C_{10}$ alkyl or alkenyl, a $C_6$–$C_{10}$ cycloalkyl, a $C_6$ to $C_{14}$ aryl, an alkylaryl comprising a $C_1$ to $C_{10}$ grouping in its alkyl radical and a $C_6$ to $C_{14}$ grouping in its aryl radical, —$OR^8$, $OR^8R^9$, —$NR^{10}R^{11}$, $NROR^{11}R^{12}$, —$PR^{10}R^{11}$ or $PR^{10}R^{11}R^{12}$, wherein Q can be the same or different, wherein one or both of the two Q groupings can also be bridged, and wherein $R^8$ to $R^{12}$ can be selected from H, a $C_1$ to $C_{10}$ alkyl, a $C_6$ to $C_{10}$ cycloalkyl, a $C_6$ to $C_{14}$ aryl, an alkylaryl or an arylalkyl and can be the same or different.

A halogen is understood by one skilled in the art to be fluorine, chlorine, bromine or iodine. Chlorine and bromine are preferred.

The expression $C_1$–$C_{10}$ alkyl should be understood to comprise all linear or branched alkyl radicals comprising 1 to 10 C atoms which are known to one skilled in the art, such as methyl, ethyl, n-propyl, i-propyl, n-butyl , i-butyl , t-butyl, n-pentyl, i-pentyl, neo-pentyl and hexyl, heptyl, octyl, nonyl and decyl, which can, in turn, be substituted themselves. Suitable substituents in this respect comprise halogen, nitro, hydroxyl, and also $C_1$–$C_{10}$ alkyl, as well as $C_6$–$C_{14}$ cycloalkyl or -aryl, e.g., benzoyl, trimethylphenyl, ethylphenyl, chloromethyl, chloroethyl and nitromethyl.

The expression $C_6$–$C_{14}$ cycloalkyl should be understood to comprise all mono- or polynuclear cycloalkyl radicals comprising 6 to 14 C atoms which are known to one skilled in the art, such as cyclohexyl, cycloheptyl, cyclooctyl and cyclononyl or such as partially or completely hydrogenated fluorenyl also, which in turn can be substituted themselves. Suitable substituents in this respect comprise halogen, nitro, $C_1$–$C_{10}$ alkoxy or $C_1$–$C_{10}$ alkyl, as well as $C_6$–$C_{12}$ cycloalkyl, e.g., methylcyclohexyl, chlorocyclohexyl and nitrocyclohexyl.

The expression $C_6$–$C_{14}$ aryl should be understood to comprise all mono- or polynuclear aryl radicals comprising 6 to 14 C atoms which are known to one skilled in the art, such as phenyl, naphthyl, and fluorenyl, which in turn can be substituted themselves. Suitable substituents in this respect comprise halogen, nitro, $C_1$–$C_{10}$ alkoxy or $C_1$–$C_{10}$ alkyl, as well as $C_6$–$C_{14}$ cycloalkyl or aryl, e.g., bromophenyl, chlorophenyl, toluoyl and nitrophenyl.

Q is preferably selected from a halide, particularly chloride and bromide, or from a hydride, or from methyl, ethyl or butyl.

The expression "bulky substituents" should be understood to mean all sterically demanding substituents comprising 4–50 C atoms which are known to one skilled in the art, such as phenyl, diphenylmethyl, triphenylmethyl, t.-butyl, neo-pentyl, cyclohexyl, cycloheptyl or aryl, which, in turn, can be substituted themselves. Suitable substituents in this respect comprise halogen, nitro, and also alkyl or alkoxyl, as well as cycloalkyl or aryl, e.g. phenyl, toluylmethyl, ditoluylmethyl and tritoluylmethyl. Phenyl, benzyl, triphenylmethyl, t.-butyl, neo-pentyl, cyclohexyl, fluorenyl, anthracenyl, phenanthrenyl, bromophenyl, chlorophenyl, toluyl and nitrophenyl are preferred.

The expression "aryl" should be understood to comprise all mono- or polynuclear aryl radicals comprising 6 to 14° C. atoms which are known to one skilled in the art, such as phenyl, naphthyl, anthracenyl, phenanthrenyl and fluorenyl, which, in turn, can be substituted themselves. Suitable substituents in this respect comprise halogen, nitro, and also alkyl or alkoxy, as well as cycloalkyl or aryl, e.g., bromophenyl, chlorophenyl, toluyl and nitrophenyl.

The expression "alkyl" should be understood to comprise all linear or branched alkyl radicals comprising 1 to 50 C atoms which are known to one skilled in the art, such as methyl, ethyl, n-propyl, i-propyl, n-butyl, i-butyl, t-butyl , n-pentyl, i-pentyl, neo-pentyl, hexyl and other homologues, which can in turn be substituted themselves. Suitable substituents in this respect comprise halogen, nitro, alkyl or alkoxy, hydroxyl, cycloalkyl or aryl, e.g. phenyl, trimethylphenyl, ethylphenyl, chloromethyl, chloroethyl and nitromethyl, methyl, ethyl, n-propyl, i-propyl, n-butyl, i-butyl, t-butyl and benzoyl are preferred.

M preferably represents Fe or Co,

Q preferably represents chloride, bromide or methyl

$R^1$ and $R^2$, independently of each other, preferably represent phenyl or a substituted aryl such as 2-methylphenyl, 2-ethylphenyl, 2-i-propylphenyl, 2-tert.-butyl-phenyl, 2,6-dimethylphenyl, 2,6-diisopropylphenyl, 2,6-di-tert.-butylphenyl, 2,4,6-trimethyl-phenyl, α-naphthyl or β-naphthyl, $R^3$ and $R^4$, independently of each other, preferably represent phenyl, substituted phenyl, isopropyl, tert.-butyl, cyclopentyl or cyclohexyl, $R^5$, $R^6$ and $R^7$, independently of each other, preferably represent hydrogen, methyl, ethyl, or cyclic rings, and n preferably equals 2 or 3.

Figure 1:
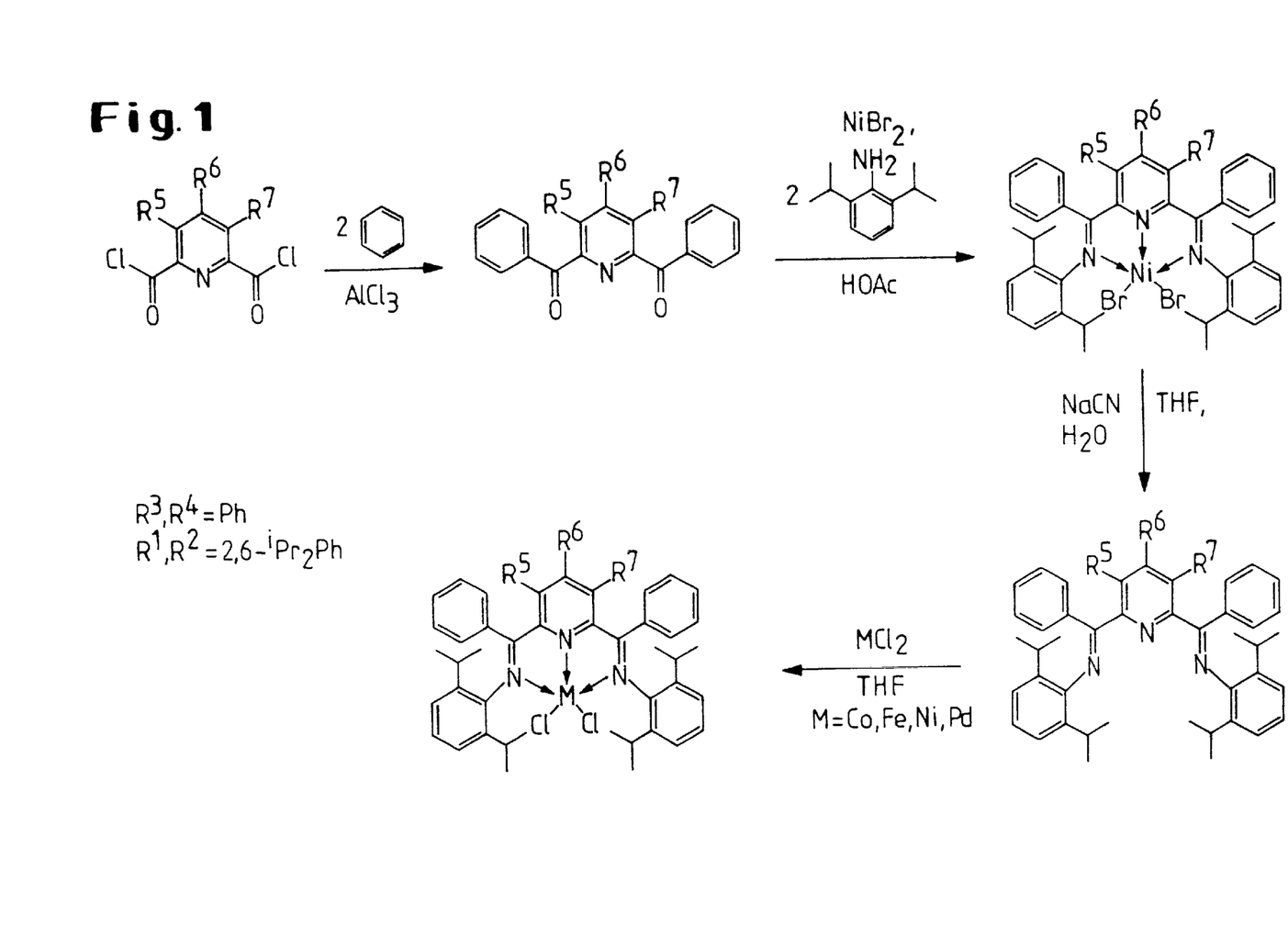
FIG. 1 shows the reaction process to form the catalyst system of the present invention.

The compound which corresponds to formula I is advantageously produced by template synthesis, starting from the correspondingly substituted pyridine derivative of general formula II, (II)

wherein $R^3$ and $R^4$, independently of each other, represent a bulky substituent, and $R^5$, $R^6$ and $R^7$, independently of each other, are selected from hydrogen, a $C_1$–$C_{10}$ alkyl group which is optionally substituted, or a $C_6$–$C_{14}$ aryl radical which is optionally substituted, or are parts of a ring system, by reaction with the correspondingly substituted primary amine derivative in the presence of a template complex-center, followed by the release of the bisiminopyridyl ligand and reaction with a metal compound to form the complex compound corresponding to general formula I. Suitable template complex-centers, such as nickel dibromide for example, are known in principle to one skilled in the art. The method is elucidated by means of FIG. 1.

A template synthesis should be understood as a synthesis which makes use of the template effect, wherein by the coordination of ligands, which in the method according to the present invention are substituted pyridine derivatives of general formula (II) and substituted anilines, around a central metal to form $MX_2$ in the method according to the invention, wherein M represents iron, cobalt, nickel or palladium, preferably nickel, and X represents a monoanionic ligand, preferably chloride or bromide, a spatial approach effect is forced to occur which is advantageous for the reaction of the ligands inside the ligand sphere and which favors the efficient formation of a new ligand by a condensation reaction. Template synthesis is known in principle and is described in detail in Angew. Chem. Int. Ed. Engl. 1994, 33, pages 375–384 and elsewhere. Reference is expressly made to the above literature reference.

The advantages of the method according to the invention are that the disadvantages of the synthesis route described in the prior art can be avoided, the yield is considerably increased, and both the formation of by-products and the requisite reaction times are significantly reduced.

Examples of compounds which form a metal complex cation include open-chain or cyclic aluminoxane compounds which correspond to general formulae III or IV, (III)

(IV)

wherein
$R_{13}$ denotes a $C_1$ to $C_8$ alkyl group, preferably a methyl or ethyl group, and n represents an integer from 3 to 30, preferably 10 to 25.

These oligomeric aluminoxane compounds are usually produced by the reaction of a trialklyaluminum solution with water, as described in EP-A-284 708 and elsewhere. The oligomeric aluminoxane compounds which are obtained in this manner generally exist as mixtures of molecules of different lengths, which can be linear or cyclic, so that n should be considered as an average value. These aluminoxane compounds can also exist in admixture with another metal alkylene, preferably with an aluminum alkylene.

It has proven to be advantageous if the compound of general formula (I) and the oligomeric aluminoxane compound are used in amounts such that the molar ratio of the aluminum from the aluminoxane component and that from (I) falls within the range from 1:1 to 20,000:1, particularly within the range from 10:1 to 2000:1.

Coordination complex compounds, which are selected from the group comprising strong, neutral Lewis acids, and ionic compounds comprising cations of Lewis acids or cations of Brönsted acids and non-coordinating anions, can also be used as the metal complex cation-forming compound.

Compounds of general formula V are preferred as strong, neutral Lewis acids, $$M^2 X^1 X^2 X^3 \quad (V)$$

wherein
$M^2$ denotes a Group 3 element, particularly B, Al or Ga, preferably B,
$X^1$, $X^2$ and $X^3$ represent H, a $C_1$ to $C_{10}$ alkyl, a $C_1$ to $C_{14}$ cycloalkyl, a $C_6$ to $C_{14}$ aryl, an alkylaryl, an arylalkyl, a halogenoalkyl, a halogenoaryl, a halogenoalkylaryl or a halogenoarylalky, each comprising C to $C_{10}$ alkyl, $C_6$ to $C_{14}$ Cycloalkyl and $C_6$ to $C_{14}$ aryl radicals, and/or fluorine, chlorine, bromine or iodine, particularly halogenoaryls, which are preferably perfluoro-substituted.

The compounds which are most preferably used here in the sense of the present invention, however, are compounds of general formula (V) in which $X^1$, $x^2$ and $X^3$ are identical, preferably tris(pentafluorophenyl)borane. These compounds, as well as methods of producing them, are known in the art and are described in WO-93/03067 and elsewhere. Other compounds which are particularly preferred are aluminum trialkyls and aluminumdialkyl hydrides such as trimethylaluminum, triethyl-aluminum, triisobutylaluminum, trioctylaluminum, and diisobutylaluminum hydride.

Compounds of general formula VI are suitable as ionic compounds comprising cations of Lewis or Bronsted acids and non-coordinating anions, $$[L]^{d+}[(M^2)^{m+}A_1 A_2 \ldots A_n]^{d-} \quad (VI)$$

wherein
L denotes a cation of a Lewis acid according to the Lewis acid-base theory, preferably carbonium, oxonium, and/or sulphonium cations, as well as cationic transition metal complexes, particularly a triphenylmethyl cation, a silver cation or a ferrocenyl cation, or L denotes a cation of a Bronsted acid according to the Bronsted acid-base theory, preferably trialkylammonium, dialkylarylammonium and/or alkyldiarylammonium, particularly N,N-dimethylanilinium,
$M^2$ denotes a Group 3 element, particularly B, Al or Ga, preferably B,
$A_1$ to $A_n$ represent radicals comprising a single negative charge, such as hydride, a $C_1$ to $C_{28}$ alkyl, a $C_6$ to $C_{14}$ cycloalkyl, a $C_6$ to $C_{14}$ aryl, an alkylaryl, an arylalkyl, a halogenoalkyl, a halogenoaryl, a halogenoalkylaryl or a halogenoarylalkyl, each comprising $C_1$ to $C_{28}$ alkyl, $C_6$ to $C_{14}$ cycloalkyl and $C_6$ to $C_{14}$ aryl radicals, or a halogen, an alkoxide, an aryloxide or an organometalloid, and $A_1$ to $A_n$ are the same or different,
d denotes an integer from 1 to 6 and d=n−m,
n denotes integers from 2 to 8, and
m is an integer from 1 to 6.

The preferred anions $[(M^2)^{m+}A_1 A_2 \ldots A_n]^{d-}$ of general formula VI are those in which $A_1$ to $A_n$ are identical, voluminous, perfluoro-substituted aromatic hydrocarbon radicals and $M^2$ represents boron or aluminum, particularly tetrakis(pentafluorophenyl)borate.

The transition metal compound or transition metal compounds are used within a range from $10^{-10}$ to $10^{-1}$ mol % with respect to the (total) monomer concentration, preferably within the range from $10^{-8}$ to $10^{-4}$. The most favorable concentration can easily be determined by a few preliminary tests.

It has proven to be advantageous if the compound of general formula (I) and the compound of general formulae (V) or (VI) are used in amounts such that the molar ratio of $M^2$ from (V) or (VI) to $M^2$ from (I) falls within the range from 0.25:1 to 1:40, particularly within the range from 1:1 to 1:10. An alkylating agent of general formula (III) or (IV) or of general formula (VII) can optionally be used, wherein the relative molar ratio between the transition metal component, the compound of general formulae (V) or (VI), and the alkylating component (III), (IV) or (VII) preferably falls within the range from 1:0.25:2 to 1:40:10,000, most preferably within the range from 1:1:10 to 1:5:1000.

Examples of alkylating agents which can be used include aluminum compounds which correspond to general formula (VII), $$Al(R^{13})_{3-n}(X^4)_n \quad (VII)$$

wherein

R[3] denotes a $C_1$ to $C_8$ alkyl group, preferably a methyl, ethyl or i-butyl group, and n represents an integer from 3 to 30, preferably 10 to 25, X[4] represents fluorine, chlorine, bromine or iodine, preferably chlorine, and n represents an integer between 0 and 2.

Mixtures of different compounds of general formula (I), as well as mixtures of different compounds which form a metal complex cation, can also, of course, be used.

It may be advantageous to deposit the catalyst system according to the invention on a support.

The support materials which are preferably used are particulate organic or inorganic solids, the pore volume of which ranges between 0.1 and 15 ml/g, preferably between 0.25 and 5 ml/g, the specific surface of which is greater than 1, preferably 10 to 1000 $m^2/g$ (BET), the particle size of which is between 10 and 2500 μm, preferably between 50 and 1000 μm, and the surface of which can be modified in a suitable manner.

The specific surface is determined in the usual manner according to Brunauer, Emmet and Teller, *J Anorg. Chem. Soc.* 1938, 60. 309; the pore volume is determined by the centrifugation method according to McDaniel, *J Colloid Interface Sci.* 1980, 78, 31; and the particle size is determined according Cornillaut, *Appl. Opt.* 1972, 11, 265.

Without wishing to limit the present invention, examples of suitable inorganic solids which should be mentioned include silica gels, precipitated hydrated silicas, clays, aluminosilicates, french chalk, zeolites, carbon black, inorganic oxides such as silica, alumina, magnesia and titanium dioxide for example, inorganic chlorides such as magnesium chloride, sodium chloride, lithium chloride, calcium chloride and zinc chloride for example, and calcium carbonate. The aforementioned inorganic solids, which comply with the aforementioned specification and which are therefore particularly suitable for use as supports, are described in greater detail in Ullmanns Enzyklopädie der technischen Chemie, Volume 21, page 439 et seq. (silica gels), Volume 23, page 311 et seq. (clays), Volume 14, page 633 et seq. (carbon blacks), and Volume 24, page 575 et seq. (zeolites), for example.

Substances which are suitable as organic solids are pulverulent polymeric materials, preferably in the form of free-flowing powders, which exhibit the aforementioned properties. Without wishing to limit the present invention, examples thereof which should be mentioned include: polyolefins such as polyethene, polypropene, polystyrene, polystyrene-co-divinylbenzene, polybutadiene, polyethers such as polyethylene oxide, polyoxytetramethylene and polysulphides such as polyphenylene sulphide for example. Polypropylene, polystyrene or polystyrene-co-divinylbenzene are materials which are particularly suitable. The aforementioned organic solids which comply with the aforementioned specification, and which are therefore, particularly suitable for use as support materials, are described in greater detail in Ullmanns Enzyklopädie der technischen Chemie, Volume 19, page 195 et seq. (polypropylene), and Volume 19, page 265 et seq. (polystyrene).

The supported catalyst system can be produced over a wide temperature range. In general, the temperature which is employed is between the melting point and boiling point of the inert solvent mixture. Temperatures from −50 to +200° C., preferably from −20 to 100° C., most preferably from 20 to 60° C., are usually employed.

The present invention further relates to a method for the homo- or co-polymerization of α-olefins, preferably ethene, propene, isobutene, 1-butene, 1-hexene and 1-octene.

Polymerization is preferably effected by bringing the α-olefin into contact with the catalyst system according to the invention dissolved in suitable solvents, in a gaseous phase, finely distributed in a liquid, or suspended in a liquid diluent.

Other gases or finely distributed liquids, which serve for dilution, for spraying or for the dissipation of heat, can be admixed with the gaseous, liquid or sprayed monomers.

Suitable diluents or solvents include the liquids or liquefied gases which are known to one skilled in the art and which do not adversely affect the polymerization and the catalyst system, particularly saturated hydrocarbons such as pentane, hexane, cyclohexane, petrol and petroleum ether.

Polymerization can be conducted at pressures from 0.001 bar to 1000 bar, preferably from 0.1 to 100 bar, most preferably from 1 to 20 bar. Polymerization is generally conducted at temperatures from −50 to 250° C., preferably from 0 to 200° C., most preferably from 20 to 160° C.

The present invention further relates to the use of the polymers which are obtainable according to the invention for the production of moldings of all types, particularly sheets, slabs, flexible tubing, sections, claddings, extruded products and injection molded articles. Such polymers are distinguished by a significantly narrower distribution of their number average and weight average molecular weights.

The following examples serve to explain the present invention and serve to explain the carrying out of homo- and copolymerization processes which are catalyzed therewith, without the invention being restricted to these examples.

EXAMPLES

Examples 1–4

Catalyst Synthesis 2,6-Dibenzoylpyridinebis(2',-tert.-butylphenylimino)iron(II) Chloride (Catalyst A)

Example 1

Synthesis of 2,6-Dibenzoylpyridine 20.0 g (98 mmol) pyridine-2,6-dicarboxylic acid chloride in 250 ml of dry benzene were mixed with 32.4 g (243 mmol) of anhydrous aluminum trichloride under an argon atmosphere in a 500 ml round-bottom flask fitted with a reflux condenser. The batch was stirred for 4 hours under reflux, was then cooled and stirred overnight at room temperature ("RT"), and was then stirred for a further 6 hours under reflux. After cooling, the batch was carefully poured into 500 ml of iced water. The organic phase was separated and the aqueous phase was washed twice with 100 ml diethyl ether each time. The combined organic phases were washed twice with 100 ml water each time and were then dried over sodium sulphate. The solvents were removed in a rotary evaporator and the product was recrystallized from diethyl ether. Yield: 16.80 g.

$^1$H NMR (in acetone-$d_6$/TMS): δ=8.32–8.26 (m,3H), 8.14–8.06 (m,4H), 7.7–7.4 (m,6 H); MS: 287, 259.230. 182.105, 77, 51.

Example 2

Synthesis of 2,6-Dibenzoylpyridine-bis(2'-tert.-butylphenylimino)nickel(II) Bromide 0.87 g (4 mmol) of anhydrous nickel dibromide were added to a solution of 1.02 g (3.5 mmol) 2.6- dibenzoylpyridine and 1.1 ml (7 mmol) 2-tert.-butylaniline in 50 ml glacial acetic acid. The mixture was stirred for 3 hours under reflux. A brown precipitate was obtained, which was filtered hot. The residue was washed twice with 30 ml diethyl ether each time, and was dried. Yield: 2.23 g.

FT IR (KBr): □(C=N)=1578 cm$^1$.

Example 3

Synthesis of 2,6-Dibenzoylbis(2'-tert.-butylphenylimino)pyridine 10 ml of a 10% aqueous NaCN solution were added to a suspension of 1.00 g (1.3 mmol) 2,6-dibenzoylpyridinebis (2'-tert.-butyl-phenylimino)nickel(II) bromide in 30 ml THF and stirred for 2 hours at RT. The organic phase was separated and dried over sodium sulphate. After removing the solvent, the bisiminopyridyl derivative remained as a yellow powder. Yield: 0.71 g.

$^1$H NMR (in CDCl$_3$): δ=8.11 (m, 1H), 7.79 (m,2H), 7.43–7.26 (m,6H), 7.10–6.65 (m,10 H), 1.41 (s, 18H); MS: M =549 g/mol.

Example 4

Synthesis of 2,6-Dibenzoylpyridinebis(2'-tert.-butylphenylimino)iron(II) Chloride 0.06 g (0.5 mmol) of anhydrous iron(II) chloride were added to a solution of 0.28 g (0.5 mmol) 2.6-dibenzoylbis (2'-tert.-butylphenyl-imino)pyridine in 15 ml of dry THF at room temperature and the mixture was stirred for 4 hours at RT. The solution was subsequently concentrated to half its volume and treated with 100 ml pentane. The bisiminopyridyl-iron complex was formed as a greenish-blue precipitate and was filtered off and dried under vacuum. Yield: 0.07 g.

FT IR (KBr): υ(C=N) 1600 cm$^{-1}$.

Example 5

2,6-Diacetylpyridinebis(2'-tert.-butylphenylimino) iron(II) Chloride (Catalyst B)

This complex was synthesize for comparison as described by Gibson et al. in *Chem. Commun.* 1998, 849.

Examples 6–8

2,6-Dibenzoylpyrindinebis(2',6'-tert.-butylphenylimino)iron(II) Chloride (Catalyst C)

Example 6

Synthesis of 2,6-Dibenzoylpyridinebis(2',6'-tert.-butylphenylimino)nickel(II) Bromide 1.20 g (5.5 mmol) of anhydrous nickel dibromide were added to a solution of 1.42 g (5 mmol) 2,6-dibenzoylpyridine, which was produced as described in the example of the production of catalyst A, and 1.2 ml (10 mmol) 2,6-dimethylaniline in 50 ml glacial acetic acid. The mixture was stirred for 6 hours under reflux. An orange-brown powder was precipitated, which was filtered hot. The residue was washed twice with 50 ml diethyl ether each time, and was dried. Yield: 3.35 g FT IR (KBr): υ(C=N)=1579 cm$^{-1}$, 1610 cm$^{-1}$.

Example 7

Synthesis of 2,6-Dibenzoylbis(2',6'-dimethylphenylimino)pyridine 10 ml of a 10% aqueous NaCN solution were added to a suspension of 0.71 g (1 mmol) 2,6-Dibenzoylpyridinebis(2', 6'-dimethyl-phenylimino)nickel(II) bromide in 10 ml THF and stirred for 30 minutes at RT. The organic phase was separated and dried over sodium sulphate. After removing the solvent, the bisiminopyridyl derivative remained as a slightly yellow powder. Yield: 0.40 g.

$^1$H NMR (in CDCl$_3$): δ=8.07 (m,1H), 7.77 (m,2H), 7.43–7.36 (m,6H), 6.93–6.81 (m,10H), 2.01 (s, 12H); MS: M=494 g/mol.

Example 8

Synthesis of 2,6-Dibenzoylpyridinebis(2',6'-dimethylphenylimino)iron(II) Chloride 0.08 g (0.6 mmol) of anhydrous iron(II) chloride was added at room temperature to a solution of 0.30 g (0.6 mmol) 2,6-dibenzoylbis(2',6'-dimethyl-phenylimino)pyridine in 30 ml of dry THF and the mixture was stirred for 12 hours at RT. The solution was subsequently concentrated to half its volume and treated with 100 ml hexane. The bisiminopyridyl-iron complex was formed as a blue precipitate and was filtered off and dried under vacuum. Yield: 0.26 g.

FT IR (KBr): υ(C=N) 1561 cm$^{-1}$, 1578 cm$^{-1}$.

Example 9

2,6-Diacetylpyridine-(2',6'-dimethylphenylimino) iron(II) Chloride (Catalyst D)

This complex was synthesized for comparison as described by Gibson, et al. in *Chem. Commun.* 1998, 849.

Examples 10–12

2,6-Dibenzoylpyridine(2',6'-diisopropylphenylimino) iron(II) Chloride (Catalyst E)

Example 10

Synthesis of 2,6-Dibenzoylpyridinebis(2',6'-diisopropylphenylimino)nickel(II) Bromide 0.87 g (4 mmol) of anhydrous nickel dibromide were added to a solution of 1.00 g (3.5 mmol) 2,6-dibenzoylpyridine, which was produced as described in the example of the production of catalyst A, and 1.3 ml (7 mmol) 2,6-diisopropylaniline in 60 ml glacial acetic acid. The mixture was stirred for 14 hours under reflux. An orange-brown powder was precipitated, which was filtered hot. The residue was washed twice with 20 ml diethyl ether each time, and was dried. Yield: 2.87 g FT IR (KBr): υ(C=N)=1574 cm$^{-1}$, 1610 cm$^{-1}$.

Example 11

Synthesis of 2,6-Dibenzoylbis(2',6'-diisopropylphenylimino)pyridine 10 ml of a 10% aqueous NaCN solution were added to a suspension of 1.00 g (1.2 mmol) 2,6-dibenzoylpyridinebis (2'.6'-diisopropylphenylimino)nickel(II) bromide in 30 ml THF and stirred for 2 hours at RT. The organic phase was separated and dried over sodium sulphate. After removing the solvent, the bisiminopyridyl derivative remained as a slightly yellow powder. Yield: 0.60 g.

$^1$H NMR (in CDCl$_3$): δ=8.30–6.96 (m,19H). 2.85 (m,4H), 1.09–0.89 (m,24 H)

Example 12

Synthesis of 2,6-Dibenzoylpyridinebis(2',6'-diisopropylphenylimino)iron(II) Chloride 0.06 g (0.5 mmol) of anhydrous iron(II) chloride was added at room temperature to a solution of 0.30 g (0.5 mmol)

2,6-dibenzoylbis(2',6'-diisopropyl-phenylimino)-pyridine in 30 ml of dry THF and the mixture was stirred for 50 hours at RT. The solution was subsequently concentrated to half its volume and treated with 100 ml hexane. The bisiminopyridyl-iron complex was formed as a blue-green precipitate and was filtered off and dried under vacuum. Yield: 0.24 g. FT IR (KBr): $\upsilon$(C=N) 1575 cm$^{-1}$.

Examples 13–15

2,6-Diacetylpyridine(2',6'-diisopropylphenylimino) iron(II) Chloride (Catalyst F)

Example 13

Synthesis of 2,6-Diacetylpyridinebis(2',6'-diisopropylphenylimino)nickel(II) Bromide 1.20 g (5.5 mmol) of anhydrous nickel dibromide were added to a solution of 0.82 g (5 mmol) 2,6-diisopropylaniline in 50 ml glacial acetic acid, and the mixture was stirred for 3 hours under reflux. An orange precipitate was formed, which was filtered hot. The residue was washed three times with 20 ml diethyl ether each time, and was dried. Yield: 2.63 g.

FT IR (KBr): $\upsilon$(C=N) 1581 cm$^{-1}$, 1617 cm$^{-1}$.

Example 14

Synthesis of 2,6-Diacetylbis(2',6'-diisopropylphenylimino)pyridine 10 ml of a 10% aqueous NaCN solution were added to a suspension of 1.00 g (1.4 mmol) 2,6-dibenzoylpyridinebis (2',6'-diisopropylphenylimino)-nickel(II) bromide in 20 ml methylene chloride and stirred for 2 hours at RT. The organic phase was separated and dried over sodium sulphate. After removing the solvent, the bisiminopyridyl derivative remained as a yellow powder. Yield: 0.68 g.

$^1$H NMR (in CDCl$_3$): $\delta$=8.52–7.10 (m,9H), 2.83 (sp,4H), 2.27 (s,6H), 1.19–1.12 (d,24H).

Example 15

Synthesis of 2,6-Diacetylpyridinebis(2',6'-diisopropylphenylimino)iron(II) Chloride 0.06 g (0.5 mmol) of anhydrous iron(II) chloride were added at room temperature to a solution of 0.30 g (0.5 mmol) 2,6-diacetylbis(2',6'-diisopropylphenylimino)pyridine in 30 ml of dry THF and the mixture was stirred for 12 hours at RT. The solution was subsequently concentrated to half its volume and treated with 100 ml hexane. The bisiminopyridyl-iron complex was formed as a blue precipitate and was filtered off and dried under vacuum. Yield: 0.26 g.

FT IR (KBr): $\upsilon$(C=N) 1561 cm$^{-1}$, 1578 cm$^{-1}$.

Examples 16–17

2,6-Dibenzoylpyridine(2',6'-diisopropylphenylimino) cobalt(II) Chloride (Catalyst G)

Example 16

Synthesis of 2,6-Dibenzoylbis(2',6'-diisopropylphenylimino)pyridine

It was also possible to synthesize 2,6-dibenzoylbis(2',6'-diisopropyl-phenylimino)pyridine in the manner described in the example of the production of catalyst E. However, this compound could not be obtained by the reaction of 2,6-dibenzoylpyridine with 2.6-diisopropylaniline in ethanol under the effect of acids.

A solution of 0.4 ml (3.5 mmol) titanium tetrachloride in 20 ml toluene was added drop-wise at 0° C. to a solution of 3.6 ml (19 mmol) 2,6-diisopropylaniline and 0.91 g (3.2 mmol) 2,6-dibenzoylpyridine in 50 ml toluene. After the addition was complete, the batch was stirred for 90 minutes at RT and was subsequently stirred for 12 hours under reflux. After cooling to RT, the orange-colored suspension was filtered and the residue was washed three times with 30 ml toluene each time. The solvent was removed by distillation and 100 ml hexane were added to complete the precipitation of the hydrochloride. The batch was filtered again and the filtrate was freed from solvent. The residue was subsequently recrystallized from methanol. 2,6-dibenzoylbis(2,6-diisopropylphenyl-imino)pyridine crystallized at −18° C. as a slightly yellow solid. Yield: 0.92 g.

$^1$H NMR (in CDCl$_3$):=8.05–6.83 (m, 19H), 2.87 (m,4H), 1.10–0.89 (dd, 24H).

Example 17

Synthesis of 2,6-Dibenzoylpyridinebis(2',6'-diisopropylphenylimino)cobalt(II) Chloride 0.06 g (0.5 mmol) of anhydrous cobalt(II) chloride were added at room temperature to a solution of 0.30 g (0.5 mmol) 2,6-dibenzoylbis(2',6'-diisopropylphenylimino)pyridine in 30 ml of dry THF and the mixture was stirred for 12 hours at RT. The solution was subsequently concentrated to half its volume and treated with 100 ml hexane. The bisiminopyridylcobalt complex was formed as a golden yellow precipitate and was filtered off under vacuum and dried. Yield: 0.26 g.

FT IR (KBr): $\upsilon$(C=N) 1572 cm$^{-1}$.

Example 18

2,6-Diacetylpyridine(2',6'-diisopropylphenylimino) cobalt(II) Chloride (Catalyst H)

Synthesis of 2,6-Diacetylpyridinebis(2',6'-diisopropylphenylimino)cobalt(II) Chloride 0.06 g (0.5 mmol) of anhydrous cobalt(II) chloride were added at room temperature to a solution of 0.24 g (0.5 mmol) 2,6-diacetylbis(2',6'-diisopropylphenylimino)pyridine, which was produced as described in the example of the production of catalyst F, in 30 ml of dry THF, and the mixture was stirred for 48 hours at RT. A golden brown precipitate was formed, the precipitation of which was completed by the addition of 100 ml hexane. The precipitate was filtered off and dried under vacuum. Yield: 0.25 g.

FT-IR (KBr): $\upsilon$(C=N) 1571 cm$^{-1}$.

Examples 19–38

Polymerization Experiments

Example 19

A 1 liter autoclave was heated at 95° C. for 1 hour under the vacuum from an oil pump and was flushed three times with Ar in the course of this procedure. The autoclave was subsequently maintained at a controlled temperature of 30° C. and 248 mg methylaluminoxane and 200 ml of dry toluene were introduced. Ethene was introduced under a pressure of 3.4 bar, and after the solution was saturated 1 ml of a $5 \cdot 10^{-4}$ mol/liter solution of catalyst A in toluene was added. The batch was polymerized for 30 minutes at a constant pressure of 3.4 bar. The experiment was terminated by blowing off the ethene and adding 5 ml ethanol. The batch was poured into a mixture of 500 ml ethanol and 100 ml of 10% hydrochloric acid and was stirred for 18 hours at room temperature. The polymer was filtered off and washed twice with ethanol. 1.61 g polymer were isolated.

Example 20

The procedure and conditions were the same as in Example 19, except that 47 mg methylaluminoxane were used instead of 248 mg. 1.48 g polymer were isolated in this example.

Example 21/Comparative Example

This experiment was conducted as in Example 19, except that catalyst B was used as the catalyst component. 8.05 g polymer were isolated in this comparative example.

Example 22/Comparative Example

This experiment was conducted as in Example 20, except that catalyst B was used as the catalyst component. 3.35 g polymer were isolated in this comparative example.

Example 23

The autoclave was pretreated as described in Example 19. The autoclave was charged with 58 mg methylaluminoxane and 400 ml of dry toluene and was maintained at a temperature of 0° C. Ethene was introduced under a pressure of 2.1 bar, and after the solution was saturated 1 ml of a $2 \times 10^{-4}$ mol/liter solution of catalyst C in toluene was added. The batch was polymerized for 60 minutes at 0° C. and at a constant pressure of 2.1 bar. The experiment was terminated by blowing off the ethene and adding 5 ml ethanol. Work-up was effected as described in polymerization example 1. 4.24 g polymer were isolated.

Example 24

The procedure and conditions were the same as in Example 23, except that a temperature of 30° C. and a constant ethene pressure of 3.4 bar were employed. 2.44 g polymer were isolated in this example.

Example 25

The procedure and conditions were the same as in Example 23, except that a temperature of 30° C. and a constant ethene pressure of 5.1 bar were employed. 5.79 g polymer were isolated in this example.

Example 26/Comparative Example

The autoclave was pretreated as described in Example 19. The autoclave was charged with 116 mg methylaluminoxane and 400 ml of dry toluene and was maintained at a temperature of 30° C. Ethene was introduced under a pressure of 3.4 bar, and after the solution was saturated, 1 ml of a $1 \cdot 10^{-4}$ mol/liter solution of catalyst D in toluene was added. The batch was polymerized for 90 minutes at 30° C. and at a constant pressure of 3.4 bar. Polymerization was terminated and the product was worked up as described in Example 19. 0.28 g polymer were isolated in this comparative example.

Example 27

This experiment was conducted as in Example 23, except that catalyst E was used as the catalyst component. 0.72 g polymer were isolated in this example.

Example 28

The procedure and conditions were the same as in Example 23, except that a temperature of 30° C. and a constant ethene pressure of 3.4 bar were employed, and catalyst E was used as the catalyst component. 1.19 g polymer were isolated in this example.

Example 29

The procedure and conditions were the same as in Example 23, except that a temperature of 60° C. and a constant ethene pressure of 4.9 bar were employed, and catalyst E was used as the catalyst component. 0.72 g polymer were isolated in this example.

Example 30/Comparative Example

This experiment was conducted as described for Example 26, except that catalyst F was used as the catalyst component. 10.70 g polymer were isolated in this comparative example.

Example 31

This experiment was conducted as described for Example 23, except that catalyst G was used as the catalyst component. 4.24 g polymer were isolated in this example.

Example 32

The procedure and conditions were as in Example 23, except that a temperature of 30° C. and a constant ethene pressure of 3.4 bar were employed, and catalyst G was used as the catalyst component. 3.75 g polymer were isolated in this example.

Example 33

The procedure and conditions were as in Example 23, except that a temperature of 60° C. and a constant ethene pressure of 4.9 bar were employed, and catalyst G was used as the catalyst component. 0.63 g polymer were isolated in this example.

Example 34

The procedure and conditions were as in Example 23, except that a temperature of 60° C. and a constant ethene pressure of 5.1 bar were employed, and catalyst G was used as the catalyst component. 1.79 g polymer were isolated in this example.

Example 35/Comparative Example

This experiment was conducted as described for Example 23, except that catalyst H was used as the catalyst component. Polymerization was effected at 30° C. and at a constant ethene pressure of 3.4 bar. 0.31 g polymer was isolated in this comparative example.

Example 36

281 mg methylaluminoxane in 200 ml of dry toluene were placed in a 1 liter glass autoclave at 30° C. The batch was saturated with propene at 5.7 bar, ethene was subsequently introduced at 0.3 bar, and after the solution was saturated 5 ml of a $3.6 \times 10^{-3}$ mol/liter solution of catalyst C in toluene were added. The batch was polymerized for 60 minutes at 30° C. with the subsequent addition of ethene, under a total pressure of 6 bar. The experiment was terminated by blowing off the ethene and adding 5 ml ethanol. The batch was poured into a mixture of 500 ml ethanol and 100 ml of 10% hydrochloric acid and was stirred at room temperature. The polymer was filtered off and washed twice with ethanol. 12.45 g copolymer were isolated after drying. The extent of $C_3$ incorporation, as determined by NMR spectroscopy, was 15.2%.

Example 37

236 mg methylaluminoxane in 200 ml of dry toluene were placed in a 1 liter glass autoclave at 30° C. Propene was introduced at 6 bar, and after the solution was saturated 5 ml of a $3.8 \times 10^{-3}$ mol/liter solution of catalyst C in toluene were added. The batch was polymerized for 140 minutes at 30° C. under a constant pressure of 6 bar. The experiment was terminated by blowing off the ethene and adding 5 ml ethanol. The batch was poured into a mixture of 500 ml ethanol and 100 ml of 10% hydrochloric acid and was stirred at room temperature. The polymer was filtered off and washed twice with ethanol. 1.38 g polypropylene were isolated.

Example 38

The experiment was conducted as described for Example 37, except 259 mg MAO and 5 ml of a $1.6 \times 10^{-3}$ mol/liter solution of catalyst D was used as the catalyst component. 11.21 g polymer were isolated in this example after a polymerization time of 120 minutes.

The results obtained and the properties of the isolated polymers are summarized in the following Tables.

It can be seen from the results of the polymerization experiments that the catalysts according to the invention polymerize ethene to form polyethene which has a significantly narrow molecular weight distribution. The narrow molecular weight distribution which is observed is characteristic of "single site" catalyst systems. Due to its higher degree of crystallinity, which amongst other indications is a measure of its degree of branching, the polyethene obtained according to the invention constitutes a polymer which is less branched than that which can be obtained with comparative system B.

It can also be seen that catalysts with a higher activity, or with the property of producing polymers of higher molecular weights, are obtained by substitution in positions $R^3$ and $R^4$ according to formula I. In the case of the cobalt catalysts, the high activity and high molecular weight is achieved solely by the substitution according to the invention of positions $R^3$ and $R^4$.

It can further be seen that the production of polypropene with a higher molecular weight and a higher isotactic index is achieved by using the catalysts according to the invention. The present invention further relates to this polypropene.

A high activity is advantageous for economic reasons, and both the high molecular weight and the high degree of stereoregularity of the polyolefins produced using the catalyst system according to the present invention are advantageous, due to the properties of these materials and the processability thereof.

TABLE 1

ESummary of the results of the polymerization experiments using ethene (Examples 19–38)

| Ex. | Catalyst | $T_{poly}$ [° C.] | $P_{ethene}$ [bar] | [M] [μmol/l] | [Al/M] | Yield [g] | Activity [kg/mol Mh] |
|---|---|---|---|---|---|---|---|
| 19 | A | 30 | 3.4 | 2.5 | 8600 | 1.61 | 6400 |
| 20 | A | 30 | 3.4 | 2.5 | 1700 | 1.48 | 5900 |

TABLE 1-continued

| 21 | B | 30 | 3.4 | 2.5 | 8600 | 8.05 | 32200 |
|---|---|---|---|---|---|---|---|
| 22 | B | 30 | 3.4 | 2.5 | 1700 | 3.35 | 13400 |
| 23 | C | 0 | 2.1 | 0.5 | 5000 | 4.24 | 106000 |
| 24 | C | 30 | 3.4 | 0.5 | 5000 | 2.44 | 61000 |
| 25 | C | 30 | 5.1 | 0.5 | 5000 | 5.79 | 145000 |
| 26 | D | 30 | 3.4 | 0.25 | 20000 | 0.28 | 1900 |
| 27 | E | 0 | 2.1 | 0.5 | 5000 | 0.72 | 3600 |
| 28 | E | 30 | 3.4 | 0.5 | 5000 | 1.19 | 6000 |
| 29 | F | 60 | 4.9 | 0.5 | 5000 | 0.72 | 3600 |
| 30 | F | 30 | 3.4 | 0.25 | 20000 | 10.70 | 71000 |
| 31 | G | 0 | 2.1 | 0.5 | 5000 | 4.24 | 21200 |
| 32 | G | 30 | 3.4 | 0.5 | 5000 | 3.75 | 18800 |
| 33 | G | 60 | 4.9 | 0.5 | 5000 | 0.63 | 3200 |
| 34 | G | 30 | 5.1 | 0.5 | 5000 | 1.79 | 9000 |
| 35 | H | 30 | 3.4 | 0.5 | 5000 | 0.31 | 1600 |

Summary of the results of the polymerization experiments using ethene (Examples 19–38)

| Ex. | $M_\eta$ [g/mol] | $M_N$ [g/mol] | $M_W$ [g/mol] | $M_W/M_N$ | $T_m$ [° C.] | Crystallinity [%] |
|---|---|---|---|---|---|---|
| 19 | 49000 | 4500 | 43500 | 9.7 | 134 | 85 |
| 20 | 62000 | 12400 | 40000 | 3.2 | 139 | 78 |
| 21 | — | 6600 | 194000 | 29.3 | 142 | 75 |
| 22 | — | 9600 | 99000 | 10.3 | 140 | 74 |
| 23 | — | — | — | — | 129 | 82 |
| 24 | — | — | — | — | 127 | 79 |
| 25 | — | — | — | — | 129 | 75 |
| 26 | — | — | — | — | 136 | 64 |
| 27 | 860000 | — | — | — | 139 | 41 |
| 28 | — | — | — | — | 143 | 57 |
| 29 | 71000 | — | — | — | 140 | 69 |
| 30 | 324000 | — | — | 13.0 | 143 | 61 |
| 31 | 2524000 | — | — | — | 139 | 37 |
| 32 | 974000 | — | — | — | 143 | 43 |
| 33 | 279000 | — | — | — | 139 | 56 |
| 34 | 1014000 | — | — | — | 144 | 48 |
| 35 | 25000 | — | — | — | 135 | 77 |

M = Fe, Co

TABLE 2

Summary of the results of the polymerization experiments (Examples 36–38)

| Ex. | Catalyst | $T_{poly}$ [° C.] | $P_{propene}$ [bar] | $P_{ethene}$ [bar] | [M] [μmol/l] | [Al] [M] | Yield [g] |
|---|---|---|---|---|---|---|---|
| 36 | C | 30 | 5.7 | 0.3 | 18 | 270 | 12.45 |
| 37 | C | 30 | 6 | — | 19 | 210 | 1.38 |
| 38 | D | 30 | 6 | — | 8 | 560 | 11.21 |

| Ex. | Activity [kg/mol] M.h] | $M_\eta$ [g/mol] | mmmm [%] | rrrr [%] | $T_g$ [° C.] | $T_m$ [° C.] | $C_3$ content [%] |
|---|---|---|---|---|---|---|---|
| 36 | 690 | 2500 | — | — | — | 68.8 | 15.2 |
| 37 | 30 | 57000 | 39.3 | 1.4 | −22.7 | — | — |
| 38 | 690 | 3900 | 29.9 | | 1.6 | −26.0 | — |

M = Fe

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A catalyst system comprising a compound of general formula (I)

wherein

M is cobalt,

Q is a mono-anionic or non-anionic ligand, $R^1$ and $R^2$, independently of each other, represent an aryl radical which is optionally substituted, $R^3$ and $R^4$, independently of each other, represent a bulky substituent,

$R^5$, $R^6$ and $R^7$, independently of each other, are selected from hydrogen, an alkyl group which is optionally substituted, or an aryl radical which is optionally substituted, or are parts of a ring system, and n represents an integer within the range from 1 to 3, and containing one or more compounds which form a transition metal complex cation.

2. A catalyst system according to claim 1, wherein the bulky substituent represents phenyl, tert.-butyl, cyclohexyl or cyclopentyl.

3. A method of producing a catalyst system comprising contacting a compound of general formula (I)

wherein

M is cobalt,

Q is a mono-anionic or non-anionic ligand,

$R^1$ and $R^2$, independently of each other, represent an aryl radical which is optionally substituted, $R^3$ and $R^4$, independently of each other, represent a bulky substituent, $R^5$, $R^6$ and $R^7$, independently of each other, are selected from hydrogen, an alkyl group which is optionally substituted, or an aryl radical which is optionally substituted, or are parts of a ring system, and n represents an integer within the range from 1 to 3, with one or more compounds which form a transition metal complex cation, wherein the production is effected via a template synthesis.

4. A method for the homo- or copolymerization of α-olefins comprising contacting a compound of general formula (I)

wherein

M is cobalt,

Q is a mono-anionic or non-anionic ligand, $R^1$ and $R^2$, independently of each other, represent an aryl radical which is optionally substituted, $R^3$ and $R^4$, independently of each other, represent a bulky substituent, $R^5$, $R^6$ and $R^7$, independently of each other, are selected from hydrogen, an alkyl group which is optionally substituted, or an aryl radical which is optionally substituted, or are parts of a ring system, and n represents an integer within the range from 1 to 3, and one or more compounds which form a transition metal complex cation with said α-olefins.

* * * * *